(12) United States Patent
Chikkali et al.

(10) Patent No.: US 12,377,404 B2
(45) Date of Patent: Aug. 5, 2025

(54) HOMOGENEOUS SINGLE SITE CATALYST AND ITS USE IN PREPARING LINEAR POLYETHYLENE

(71) Applicants: COUNCIL OF SCIENTIFIC & INDUSTRIAL RESEARCH, New Delhi (IN); GAIL (INDIA) LTD, Noida (IN)

(72) Inventors: Samir Hujur Chikkali, Pune (IN); Shailaja Jawoor, Pune (IN); Rajkumar S. Birajdar, Pune (IN); Sandip B. Pawal, Pune (IN); Nandakumar Thenmani, Noida (IN); Parivesh Chugh, Noida (IN)

(73) Assignees: Council of Scientific & Industrial Research, New Delhi (IN); GAIL (India) Ltd., Noida (IN)

( * ) Notice: Subject to any disclaimer, the term of this patent is extended or adjusted under 35 U.S.C. 154(b) by 284 days.

(21) Appl. No.: 17/928,335

(22) PCT Filed: May 28, 2021

(86) PCT No.: PCT/IN2021/050520
§ 371 (c)(1),
(2) Date: Nov. 29, 2022

(87) PCT Pub. No.: WO2021/240549
PCT Pub. Date: Dec. 2, 2021

(65) Prior Publication Data
US 2023/0201815 A1  Jun. 29, 2023

(30) Foreign Application Priority Data
May 29, 2020 (IN) .............................. 202011022536

(51) Int. Cl.
*B01J 31/18* (2006.01)
*B01J 37/04* (2006.01)
(Continued)

(52) U.S. Cl.
CPC ........... *B01J 31/1825* (2013.01); *B01J 37/04* (2013.01); *C08F 2/06* (2013.01); *C08F 4/6592* (2013.01);
(Continued)

(58) Field of Classification Search
None
See application file for complete search history.

(56) References Cited

PUBLICATIONS

Deshmukh et al., "Neutral Imino-Methyl Benzenesulfonate-Ligated PD(II) Complexes and Implications in Ethylene Polymerization", *ACS Omega*, 4, 9502-9511, 2019.
(Continued)

*Primary Examiner* — Yun Qian
(74) *Attorney, Agent, or Firm* — Norton Rose Fulbright US LLP

(57) ABSTRACT

The present invention discloses a homogeneous, single site catalyst of formula (I) and a process for preparation thereof using a ligand. The present invention further discloses a process for preparation of linear polyethylene of high
(Continued)

molecular weight and degree of crystallinity by using the homogeneous, single site catalyst of formula I.

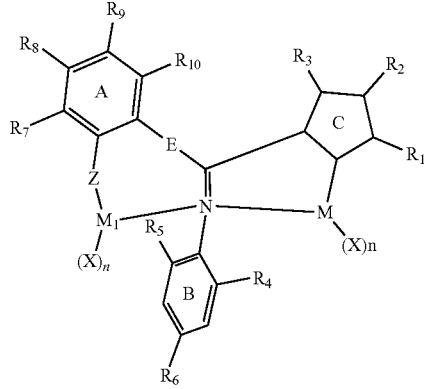

Formula I

9 Claims, 3 Drawing Sheets

(51) Int. Cl.
- C08F 2/06 (2006.01)
- C08F 4/6592 (2006.01)
- C08F 10/02 (2006.01)

(52) U.S. Cl.
CPC ........... *C08F 10/02* (2013.01); *B01J 2531/46* (2013.01); *B01J 2531/48* (2013.01); *B01J 2531/62* (2013.01)

(56) References Cited

PUBLICATIONS

Enders et al., "New Chromium (III) Complexes as Highly Active Catalysts for Olefin Polymerization", *Organometallics*, 20, 5005-5007, 2001.
International Search Report and Written Opinion issued in corresponding International Application No. PCT/IN2021/050520 mailed Sep. 27, 2021.
Small et al., "New Chromium Complexes for Ethylene Oligomerization: Extended Use of Tridentate Ligands in Metal-Catalyzed Olefin Polymerization", *Macromolecules*, 37:4375-4386, 2004.
Xu et al., "Chromium (III) Complexes with Chelating Anilido-Imine Ligands; Synthesis, Structures, and Catalytic Properties for Ethylene Polymerization", Eur. J. Inorg. Chem., 3360-3364, 2010.
Zhang et al. "New Chromium (III) Complexes with Imine—Cyclopentadienyl Ligands: Synthesis, Characterization, and Catalytic Properties for Ethylene Polymerization", *Organometallics*, 30: 433-440; 2011.
Zhao et al., "Synthesis and Characterization of Constrained Geometry Oxygen and Sulphur Functionalized Cyclopentadienylchromium Complexes and Their Use in Catalysis for Olefin Polymerization", *Molecules*, 22: 865, 2017.

HOMOGENEOUS SINGLE SITE CATALYST AND ITS USE IN PREPARING LINEAR POLYETHYLENE

CROSS-REFERENCE TO RELATED APPLICATIONS

This application is a national phase application under 35 U.S.C. § 371 of International Application No. PCT/IN2021/050520 filed 28 May 2021, which claims priority to Indian Patent Application No. 202011022536 filed 29 May 2020. The entire contents of each of the above-referenced disclosures is specifically incorporated herein by reference without disclaimer.

FIELD OF THE INVENTION

The present invention relates to a homogeneous single site catalyst of formula I and its preparation. The present invention further relates to a process for preparation of linear polyethylene by using the homogeneous catalyst of formula I.

BACKGROUND AND PRIOR ART OF THE INVENTION

Polyethylene is the most widely used polyolefin with worldwide production of 80 million tons per annum. For olefin polymerization, designing a well-organized molecular catalysts that controls the activity has caught the attention of scientific community. Most of the high-density polyethylene (HDPE) is produced by the heterogeneous supported catalyst all over the globe. Homogeneous single site catalysts which are capable of producing high-density polyethylene are preferred over heterogeneous catalyst systems because heterogeneous catalyst are known to have multiple active sites which leads to broad molecular weight distribution. Selected Ti/Zr/Cr catalysts containing neutral and anionic donor ligands are known to produce high to ultrahigh molecular weight polyethylene with narrow molecular weight distribution. Article titled, "New Chromium(III) Complexes with Imine-Cyclopentadienyl Ligands: Synthesis, Characterization, and Catalytic Properties for Ethylene Polymerization" by Lei Zhand et al, published in Organometallics, 2012, 31, 7368-7374 reported an imine and cyclopentadiene based catalyst system which is able to produce Ultra high molecular weight Polyethylene (UHMWPE) with high activity at atmospheric pressure. The complexes containing cyclopentadienyl-phenoxy-titanium were reported to exhibit high catalytic activity but produces polymers with high PDI due to their large open coordination environment.

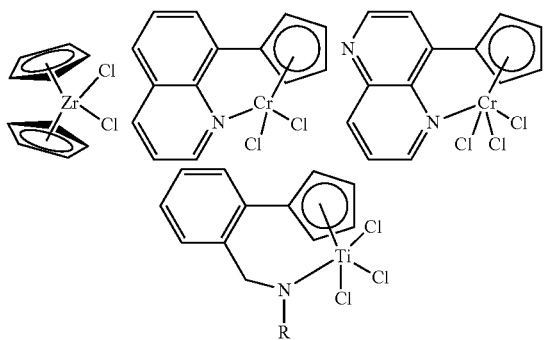

Reported Cyclopentadienyl Ligands

The reported catalysts also suffer from a further drawback that is they provide polyethylene that has poor crystallinity which can affect polymer properties such as density and hardness. Also, the catalyst reported in prior arts suffer from providing polyethylene with branching.

Linear, high molecular weight polyethylene has distinct advantages such as bearing surfaces for arthroplasty, pipes etc and there is a need to synthesize the same.

Article titled, "Neutral Imino-Methyl Benzenesulfonate-Ligated Pd(II) Complexes and Implications in Ethylene Polymerization" by Samir H. Chikkali et al. reports a single-step synthesis of a small library of six imino-methyl benzenesulfonate ligands and their complexation with palladium to yield neutral alkyl-palladium-(II) complexes. But this reports palladium complexes without any co-catalyst. While, the present work deals with co-catalyst without which the catalyst cannot give any polymer. Furthermore, these prior art catalysts are not active at 40° C. and thus teaches away from the present work.

Reported processes and catalysts do neither provide linear polyethylene, nor the requisite high molecular weight, not the desired crystallinity. And this gap in the art is fulfilled by this disclosure.

OBJECTIVES OF THE INVENTION

Main objective of the present invention is to provide a homogeneous, single site catalyst of formula (I) that enable synthesis of linear polyethylene of high molecular weight.

Another objective of the present invention is to provide a process for preparation of the catalyst of formula (I).

Still another objective of the present invention is to provide a process for preparation of linear polyethylene of high molecular weight by using the catalysts of formula (I).

SUMMARY OF THE INVENTION

Accordingly, the present invention discloses a homogeneous, single site catalyst of formula (I);

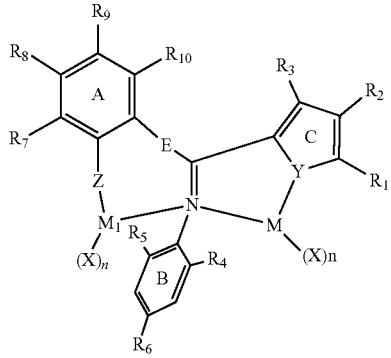

Formula I wherein,
R1-R3 are selected from the group consisting of H, Alkyl and Aryl;
R4-R6 are selected from the group consisting of H, Alkyl, Aryl, OMe and OEt;
R7-R10 are selected from the group consisting of H, Alkyl and Aryl;

M and $M_1$ are selected from the group consisting of Cr, Ti, Zr and Hf;

X is selected from the group consisting of Cl, Br and I;

n is selected from the group consisting of 2,3 and 4;

Y is selected from the group consisting of S, O, —NH and —$CH_2$;

Z is selected from the group consisting of Cyclopentadiene, Pentamethylcyclopentadiene E is selected from $CH_2$ when E=$CH_2$ then Z and $M_1$ are absent;

when Z and $M_1$ are present then E, ring C and M are absent.

In an embodiment, the present invention provides a process for preparation of the catalyst of formula (I) comprising reacting ligand with metal halide or alkyl lithium at a temperature in the range of −80° C. to 30° C. for a time period in the range of 1 to 12 hours in a solvent to obtain the catalyst of formula (I).

In another embodiment, the present invention provides a process for preparation of polyethylene comprising the steps of:
a) charging toluene into the ethylene filled reactor in an inert atmosphere followed by adding MMAO-12;
b) dissolving the catalyst of formula (I) in a solvent and adding to the reactor of step (a) and keeping the reactants stirred for 0.5 to 3 hours at a temperature range of 30-70° C. with ethylene being pumped continuously to obtain polyethylene.

The process for preparation of linear polyethylene is carried out by a batch process.

The polyethylene synthesized is linear and has a molecular weight in the range of 50000 Da to 3 million Dalton.

ABBREVIATIONS

UHMWPE: Ultra high molecular weight Polyethylene
HDPE: High-density polyethylene
DSC: Differential Scanning Calorimetry
NMR: Nuclear magnetic resonance
$TiCl_4$: Titanium tetrachloride
$CrCl_3 \cdot 0.3THF$: Chromium(III) chloride tetrahydrofuran complex
BuLi: Butyl lithium
NaBr: Sodium bromide
THF: Tetrahydrofuran
MMAO-12: 7 wt % Aluminum in Toluene, Methylaluminoxane
$ZrCl_4$: Zirconium tetrachloride tetrahydrofuran complex
$HfCl_4$: Hafnium(IV) chloride

DETAILED DESCRIPTION OF THE INVENTION

Figure 1:
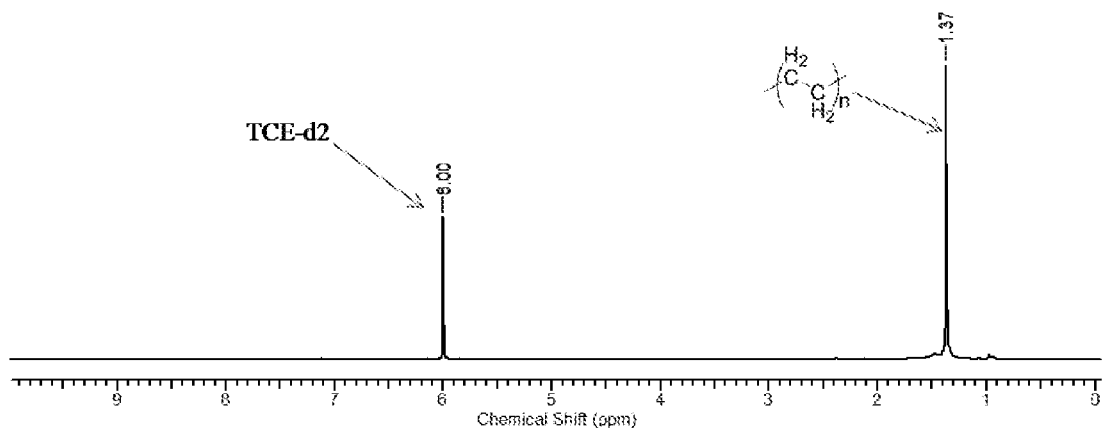
FIG. 1: High temperature (130° C.)$^1$H NMR spectrum for the polyethylene.

The invention will now be described in detail in connection with certain preferred and optional embodiments, so that various aspects thereof may be more fully understood and appreciated.

To accomplish the objectives of the invention, a homogeneous, single site catalyst of formula (I) is disclosed.

Formula I

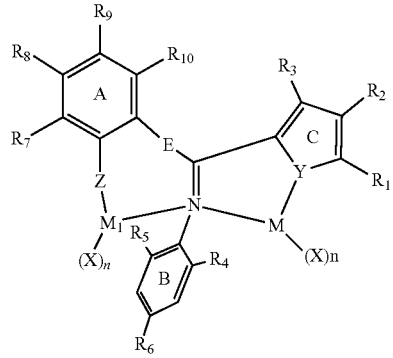

wherein,
R1-R3 are selected from the group consisting of H, Alkyl and Aryl;
R4-R6 are selected from the group consisting of H, Alkyl, Aryl, OMe and OEt;
R7-R10 are selected from the group consisting of H, Alkyl and Aryl;
M and $M_1$ are selected from the group consisting of Cr, Ti, Zr and Hf;
X is selected from the group consisting of Cl, Br and I;
n is selected from the group consisting of 2,3 and 4;
Y is selected from the group consisting of S, O, —NH and —$CH_2$;
Z is selected from the group consisting of Cyclopentadiene, Pentamethylcyclopentadiene
E is selected from $CH_2$
when E=$CH_2$ then Z and $M_1$ are absent;
when Z and $M_1$ are present then E, ring C and M are absent.

The catalyst of formula (I) is selected from CAT-9A, CAT-9B and CAT-10C.

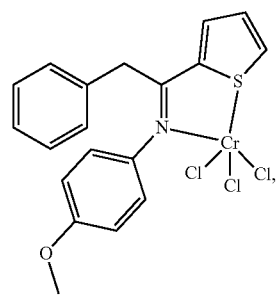

CAT-9B

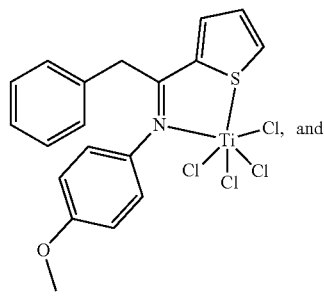

CAT-9A

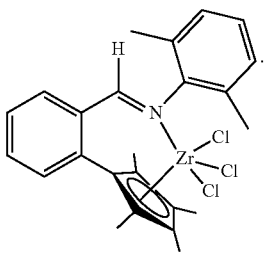

CAT-10C

In an embodiment, the present invention provides a process for preparation of the catalyst of formula (I) comprising reacting ligand with metal halide or alkyl lithium at a temperature in the range of −80° C. to 30° C. for a time period in the range of 1 to 20 hours in a solvent to obtain the catalyst of formula (I).

The ligand is selected from L1 to L10.

The ligand L1 is (Z)-2-(cyclopenta-1,3-dien-1-yl)-N-(4-methoxyphenyl)-1-phenylethan-1-imine; the ligand L2 is (Z)-2-(cyclopenta-1,3-dien-1-yl)-N-(4-methoxyphenyl)-1-(o-tolyl)ethan-imine; the ligand L3 is (Z)-2-(cyclopenta-1, 3-dien-1-yl)-1-(2,6-dimethylphenyl)-N-(4-methoxyphenyl) ethan-1-imine; the ligand L4 is (Z)-2-(cyclopenta-1,3-dien-1-yl)-1-(2,6-di-tert-butylphenyl)-N-(4-methoxyphenyl) ethan-1-imine; the ligand L5 is (Z)—N-(4-methoxyphenyl)-1-phenyl-2-(2,3,4-trimethylcyclopenta-1,3-dien-1-yl)ethan-1-imine; the ligand L6 is (Z)—N-(4-methoxyphenyl)-1-(o-tolyl)-2-(2,3,4-trimethylcyclopenta-1,3-dien-1-yl)ethan-1-imine; the ligand L7 is (Z)-1-(2,6-dimethylphenyl)-N-(4-methoxyphenyl)-2-(2,3,4-trimethylcyclopenta-1,3-dien-1-yl)ethan-1-imine; the ligand L8 is (Z)-1-(2,6-di-tert-butylphenyl)-N-(4-methoxyphenyl)-2-(2,3,4-trimethylcyclopenta-1,3-dien-1-yl)ethan-1-imine; the ligand L9 is (E)-N-(4-methoxyphenyl)-2-phenyl-1-(thiophen-2-yl) ethan-1-imine and the ligand L10 is (E)-N-(2,6-dimethylphenyl)-1-(2-(2,3,4-trimethylcyclopenta-1,3-dien-1-yl) phenyl)methanimine.

The metal halide is selected from $TiCl_4$, $CrCl_3·0.3THF$, $ZrCl_4·2THF$ and $HfCl_4$.

The alkyl lithium is butyl lithium (BuLi).

The solvent is selected from toluene, tetrahydrofuran and hexane.

In an embodiment, the present invention provides a synthetic process for preparation of ligands L1-L8 comprising the steps of:
a) adding a solution of bromoacetyl bromide in dichloromethane to the solution mixture of N, O-dimethyl hydroxylamine hydrochloride and triethyl amine solution at 0° C. and allowing the resultant solution to warm to 28° C. to 30° C. and continuing stirring for 1 to 2 hours to obtain 2-bromo-N-methoxy-N-methylacetamide;
b) adding sodium cyclopentadienylide solution in THF dropwise to a stirred solution of the amide of step (a) at the temperature −78° C. to −80° C., stirring for 3 to 4 h and adding dichloromethane to precipitate NaBr, and separating to obtain 2-(cyclopenta-1,3-dien-1-yl)-N-methoxy-N-methylacetamide;
c) adding solution of phenyl magnesium bromide in THF drop wise to a stirring solution of the amide of step (b) at 0° C. to −5° C. and continuing stirring to obtain 2-(cyclopenta-1, 3-dien-1-yl)-1-phenylethan-1-one and
d) mixing acetophenone derivatives of step (c) and p-anisidine and stirring in methanol at 50 to 100° C. for 15 to 17 h in the presence of molecular sieves, filtering and removing the solvent to obtain the corresponding ligand.

The synthetic process for preparation of ligands L1-L8 is as shown in scheme 1:

Scheme 1

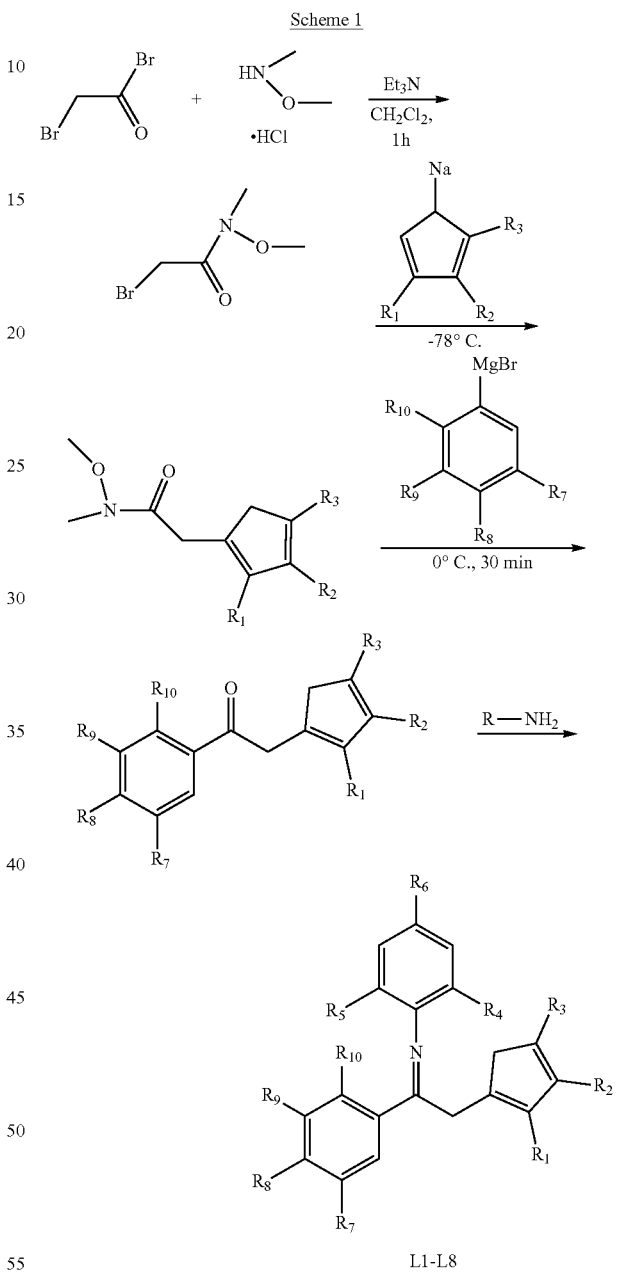

L1-L8

Wherein,

R1-R3 are selected from the group consisting of H, Alkyl and Aryl;

R4-R6 are selected from the group consisting of H, Alkyl, Aryl, OMe and OEt;

R7-R10 are selected from the group consisting of H, Alkyl and Aryl;

R is selected from the group consisting of H, Alkyl and Aryl.

L1: R1-R3=H, Alkyl and Aryl; R4-R6=H, Alkyl, Aryl, OMe and OEt; R7-R10=H, Alkyl and Aryl; and R=H, Alkyl and Aryl.

L2: R1-R3=H, Alkyl and Aryl; R4-R6=H, Alkyl, Aryl, OMe and OEt; R7-R10=H, Alkyl and Aryl; and R=H, Alkyl and Aryl.

L3: R1-R3=H, Alkyl and Aryl; R4-R6=H, Alkyl, Aryl, OMe and OEt; R7-R10=H, Alkyl and Aryl; and R=H, Alkyl and Aryl.

L4: R1-R3=H, Alkyl and Aryl; R4-R6=H, Alkyl, Aryl, OMe and OEt; R7-R10=H, Alkyl and Aryl; and R=H, Alkyl and Aryl.

L5: R1-R3=H, Alkyl and Aryl; R4-R6=H, Alkyl, Aryl, OMe and OEt; R7-R10=H, Alkyl and Aryl; and R=H, Alkyl and Aryl.

L6: R1-R3=H, Alkyl and Aryl; R4-R6=H, Alkyl, Aryl, OMe and OEt; R7-R10=H, Alkyl and Aryl; and R=H, Alkyl and Aryl.

L7: R1-R3=H, Alkyl and Aryl; R4-R6=H, Alkyl, Aryl, OMe and OEt; R7-R10=H, Alkyl and Aryl; and R=H, Alkyl and Aryl.

L8: R1-R3=H, Alkyl and Aryl; R4-R6=H, Alkyl, Aryl, OMe and OEt; R7-R10=H, Alkyl and Aryl; and R=H, Alkyl and Aryl.

Ligands L9 and L10 are synthesized by reported processes (*Org. Biomol. Chem.* 2013, 11, 412-415 and *Organometallics* 2013, 32, 4185-4191), depicted in schemes 2 and 3 herein below.

Scheme 2. Schematic representation of synthesis of ligand L9

Scheme 3. Schematic representation of synthesis of ligand L10.

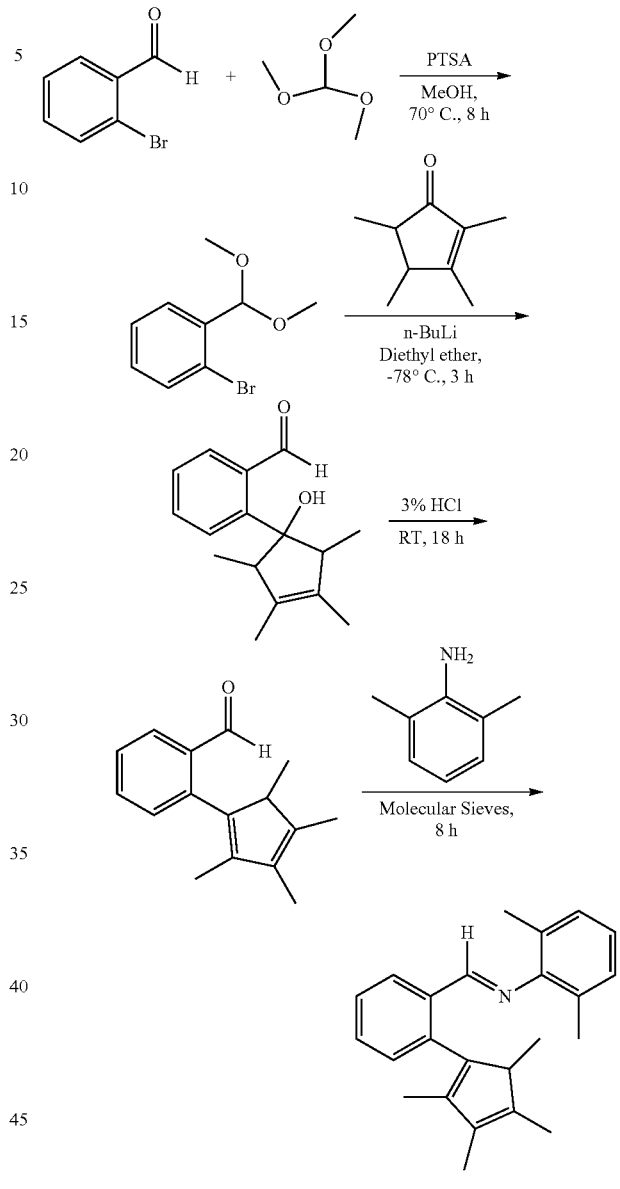

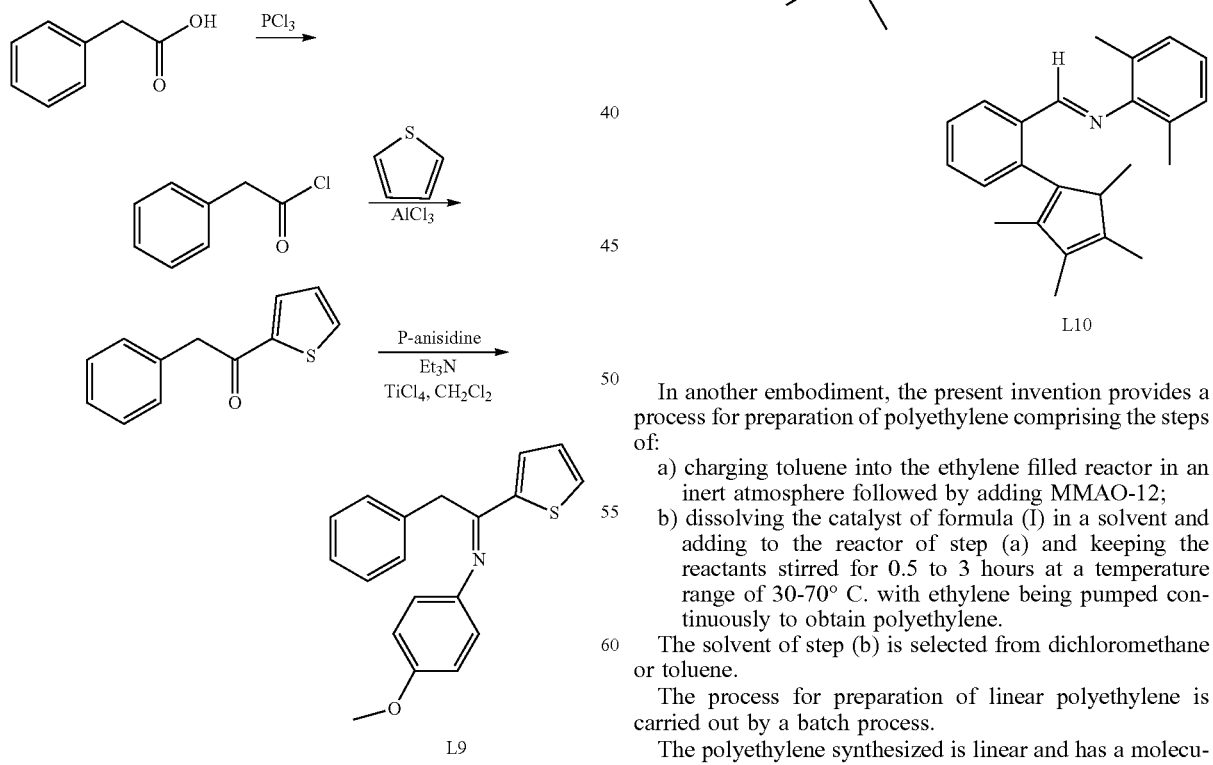

In another embodiment, the present invention provides a process for preparation of polyethylene comprising the steps of:
  a) charging toluene into the ethylene filled reactor in an inert atmosphere followed by adding MMAO-12;
  b) dissolving the catalyst of formula (I) in a solvent and adding to the reactor of step (a) and keeping the reactants stirred for 0.5 to 3 hours at a temperature range of 30-70° C. with ethylene being pumped continuously to obtain polyethylene.

The solvent of step (b) is selected from dichloromethane or toluene.

The process for preparation of linear polyethylene is carried out by a batch process.

The polyethylene synthesized is linear and has a molecular weight in the range of 50000 Da to 3 million Dalton.

The synthesized polyethylene is characterized by high temperature $^1$H NMR, refer FIG. 1.

TABLE 1

Ethylene polymerization using Ti, Zr and Cr catalysts.

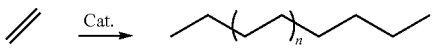

| entry | cat. | Al/cat. | temp. (° C.) | yield (g) | TOF (mol of PE/mol of M/h) | $T_m$ (° C.) | deg of cryst. (%) | Mv (Molecular weight by viscosity) Da |
|---|---|---|---|---|---|---|---|---|
| 1 | CAT-9A | 180 | 70 | 1.20 | 533 | 142.3 | 93.6 | |
| 2 | CAT-9A | 180 | 60 | 1.46 | 653 | 137.2 | 51.6 | |
| 3 | CAT-9A | 180 | 50 | 1.75 | 777 | 142.2 | 85.22 | |
| 4 | CAT-9A | 180 | 40 | 1.79 | 793 | 143.6 | 52.69 | 207600 |
| 5 | CAT-9B | 180 | 40 | 19.1 | 8450 | 139.0 | 89.11 | 1700000 |
| 6 | $^b$CAT-9B | 180 | 40 | 3.5 | 2290 | — | — | |
| 7 | CAT-10C | 180 | 40 | 5.12 | 2460 | 141.4 | 85.39 | 80000 |
| 8 | CrCl$_3$(THF)$_3$ | 180 | 40 | 1.30 | 577 | 141.3 | 75.32 | |
| 9 | TiCl$_4$ | 180 | 50 | 17.5 | 1086 | 138.5 | 72.45 | |

Figure 2:
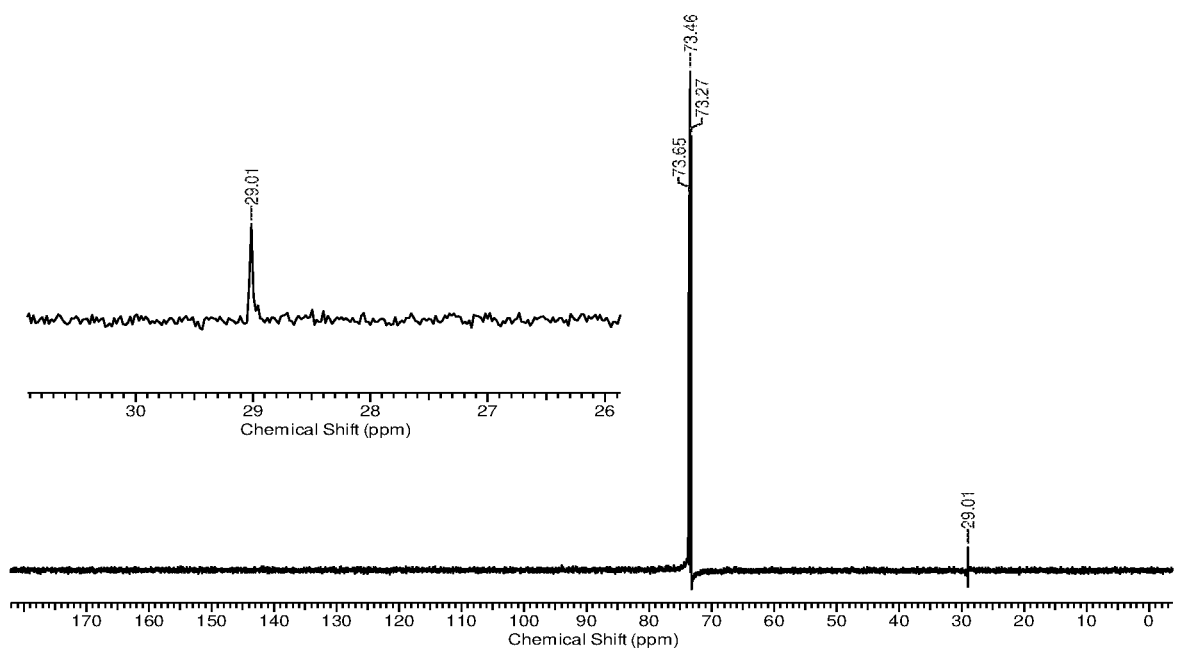
FIG. 2: High temperature (130° C.)$^{13}$C NMR spectrum for the polyethylene. The close shot (top) of the spectrum shows no branching, i.e. completely linear PE.
Figure 3:
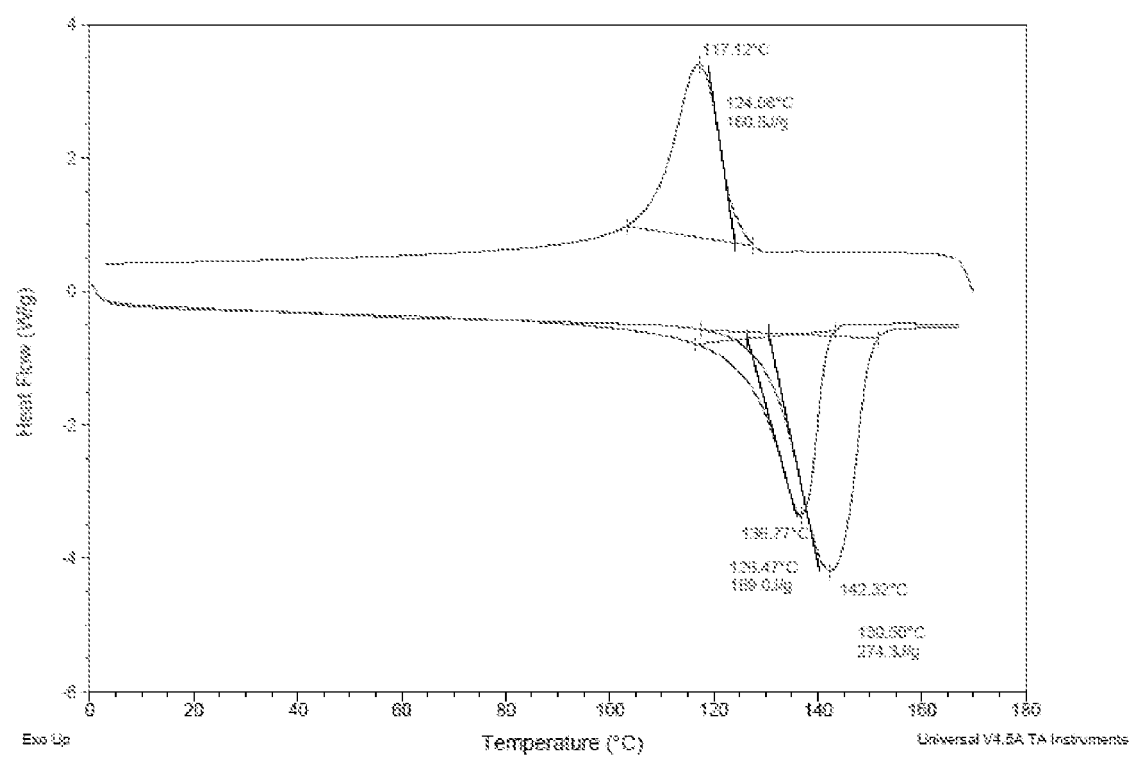
FIG. 3: DSC plot of resultant polyethylene

Conditions: Catalyst = 40 μmol in DCM (5 mL), toluene = 100 mL;
time = 2 h, Pressure = 10 bar,
$^b$time = 30 min The polyethylene synthesized is linear which was confirmed on the basis High temperature NMR experiment as shown in FIG. 1; FIG. 2 represents the melting temperature of 142.32° C. for entry no. 1 in above table and has a molecular weight in the range of 50000 Da to 3 million Dalton.

In another preferred embodiment, the polyethylene synthesized is ultra-high molecular weight polyethylene with molecular weight in the range of 500000 Da to 3 million Dalton.

The melting temperature (Tm) of the polyethylene synthesized by the process catalyzed by the catalyst of formula I is in the range of 139-144° C.

The degree of crystallinity of the polyethylene synthesized by the process catalyzed by the catalyst of formula I is in the range of 60-90%.

The polydespersity index of the polyethylene synthesized by the process catalyzed by the catalyst of formula I is in the range of 1.5 to 10.

The turn over frequency (TOF) of the polyethylene synthesized by the process catalyzed by the catalyst of formula I is in the range of >100-50000.

EXAMPLES

Following examples are given by way of illustration therefore should not be construed to limit the scope of the invention.

Materials

All experiments were carried out under argon atmosphere using standard Schlenk technique or glove box. Dry solvents were used throughout all the experiments and solvents were purified and dried according to standard procedures. Metal precursors, Modified Methylaluminooxane-12 (MMAO-12) and other starting materials were purchased from Sigma Aldrich and used as received. Ethylene cylinder was purchased from Vadilal Chemicals Ltd. Pune. Remaining all other reagents/chemicals, solvents were purchased from local suppliers (Spectrochem Pvt. Ltd.; Avra Synthesis Pvt. Ltd.; Thomas Baker Pvt. Ltd. etc). Ethylene polymerization was performed on a Büchiglasuster cyclone 075 high pressure reactor equipped with overhead mechanical stirrer, heating/cooling jacket and pressure regulators.

Solution NMR spectra were recorded on a BrukerAvance 200, 400, 500 and 600 MHz instruments. Chemical shifts are referenced to external reference trimethylsilane ($^1$H, $^{13}$C and DEPT). Multiplicities are given as follows s: singlet, d: doublet, t: triplet, m: multiplet. A TA instrument Q-100 Differential Scanning Calorimeter (DSC) was utilized to obtain the melting temperatures (Tm). The weight is kept within 6 mg ±0.1 mg for sample. During the measurement, nitrogen was continuously purged at 50 mL/min.

Example 1: Synthesis of Ligand L1-10

The synthesis of ligand L1-L8 involves following steps

A. Synthesis of
2-bromo-N-methoxy-N-methylacetamide

N,O-dimethyl hydroxylamine hydrochloride (0.482 g, 4.95 mmol) and triethyl amine (0.500 g, 4.95 mmol) were dissolved in dichloromethane in a 250 mL single neck round bottom flask and the reaction mixture was cooled to 0° C. The bromoacetyl bromide (1 g, 4.95 mmol) solution in dichloromethane was added dropwise to the N,O-dimethyl hydroxylamine hydrochloride and triethyl amine solution at 0° C. and the content was slowly warmed 25° C. The resulting reaction mixture was allowed to stir for 1 h, followed by addition of water to quench the reaction. The reaction mixture was extracted with water (3×25 mL). Further the organic layer washed with 1N HCL and saturated NaHCO$_3$ solution. The resultant organic layers were collected and dried over Na$_2$SO$_4$ and solvent was evaporated to get desired product.

$^1$H NMR (200 MHz, CDCl$_3$): 4.01 (s, 2H), 3.79 (s, 3H), 3.24 (s, 3H).

B. Synthesis of 2-(cyclopenta-1,3-dien-1-yl)-N-methoxy-N-methylacetamide

A solution of sodium cyclopentadienylide (2M in THF) (2.47 mmol) was taken in a 100 ml Schlenkflask and diluted in THF (30 mL). The above diluted sodium cyclopentadienylide solution was added dropwise to a stirred solution of 2-bromo-N-methoxy-N-methylacetamide) (0.450 g, 2.47 mmol) in THF (10 mL) at −78° C. The reaction mixture was stirred for 3 h at −78° C. before dichloromethane (20 mL) was added to facilitate precipitation of NaBr, which was removed by filtration. The solvent was removed under reduced pressure from the filtrate to leave the title product as yellow oil.

$^1$H NMR (200 MHz, CDCl$_3$): 6.51-6.18 (m, 3H), 3.67 (s, 3H), 3.59-3.54 (d, 2H), 3.19 (s, 3H), 3.03-2.98 (m, 2H).

C. Synthesis of 2-(cyclopenta-1,3-dien-1-yl)-1-phenylethan-1-one

A 100 ml Schlenk flask equipped with a magnetic stir bar was charged with 2-(cyclopenta-1,3-dien-1-yl)-N-methoxy-N-methylacetamide (0.500 g, 2.990 mmol) in dry THF and was cooled to 0° C. The phenyl magnesium bromide solution (1 M in THF) (5.981 mmol) was added drop wise to the stirring solution of amide. The reaction mixture stirred at 0° C. and the progress was monitored by TLC for 30 min. The resulting reaction mixture was quenched with saturated ammonium chloride solution and was extracted with ethyl acetate (3×25 mL). The organic phases were washed with brine and dried over Na$_2$SO$_4$ and subsequent solvent evaporation under reduced pressure yielded title compound. The crude compound was purified on silica gel using pet ether: ethyl acetate (100:0.1) as eluent to give pure product.

$^1$H NMR (400 MHz, CDCl$_3$): δ 8.02-7.99 (d, 2H), 7.58-7.44 (d, 3H), 6.46-6.20 (d, 3H), 4.10 (s, 2H), 3.03 (s, 2H)·$^{13}$C NMR (100 MHz, CDCl$_3$): δ=197.84, 140.95, 139.51, 136.64, 134.38, 134.15, 133.09, 132.29, 130.50, 130.00, 128.56, 128.52, 43.86, 41.64, 40.85, 40.06

D. Synthesis of Ligand L1-L8

The mixture of acetophenone derivatives (0.061 g, 0.331 mmol) and p-anisidine (0.041 g, 0.331 mmol) was stirred in methanol at 70° C. for 15 h in the presence of molecular sieves. The mixture was then filtered and the solvent was removed under reduced pressure to produce the corresponding N-arylketimines.

E. Synthesis of Ligand L9

Synthesis of ligand L9 involves two steps reaction as shown in Scheme 3 i. Synthesis of 2-phenyl-1-(thiophen-2-yl)ethan-1-one 1.365 g (10 mmol) of phenylacetic acid was taken in a flask fitted with a reflux condenser and a system for absorbing hydrogen chloride, phosphorus trichloride (0.436 g, 5 mmol) was added at 0° C. The mixture was heated on a steam bath for one hour. While the contents of the flask were still warm, 20 mL of thiophene was added followed by addition of anhydrous aluminium chloride (1.6 g, 12 mmol). The mixture was heated at 50° C. for one hour on a steam bath, then cooled and poured into a mixture of crushed ice and concentrated hydrochloric acid. The organic phase was dried over Na$_2$SO$_4$ and subsequent solvent evaporation under reduced pressure yielded title compound. The crude compound on silica gel chromatography using pet ether: ethyl acetate as a eluent to give pure product.

$^1$H NMR (200 MHz, CDCl$_3$): 7.72-7.70 (d, 1H), 7.56-7.52 (d, 1H), 7.29-7.19 (m, 5H), 7.06-7.02 (m, 1H), 4.13 (s, 2H).

ii. Synthesis of Imine Ligand (L9)

p-methoxyaniline (0.182 g, 1.48 mmol) and Et$_3$N (1.48 mmol) were dissolved in CH$_2$Cl$_2$ (20 mL) under argon atmosphere. The mixture was cooled by an ice-salt bath. A solution of TiCl$_4$ (0.49 mL, 1.49 mmol) was introduced via syringe to the rapidly stirred mixture. After stirring for 30 min, the ice bath was removed, and stirring continued until the mixture reached 25° C. Then, ketone (0.100 g, 0.49 mmol) in CH$_2$Cl$_2$ (5 mL) was added via syringe. The temperature of the solution was raised to 40° C. and stirring was continued for 5 h. The solvent was evaporated and the residue was subjected to chromatography and subsequent recrystallization afforded desired compound.

$^1$H NMR (200 MHz, CDCl$_3$): δ 3.70 (s, 3H), 4.00 (s, 2H), 6.69-6.79 (m, 4H), 6.87-6.91 (m, 1H), 7.08 (d, 2H), 7.04-7.21 (m, 4H), 7.32 (d, 2H)·$^{13}$C NMR (400 MHz, CDCl$_3$): δ 36.5, 55.4, 114.1, 121.0, 126.4, 127.5, 128.2, 128.5, 128.6, 129.4, 129.6, 137.2, 143.1, 145.8, 156.2, 161.3.

F. Synthesis of Ligand L10

The ligand L10 is prepared by using the synthetic route depicted in scheme 4.

i. Synthesis of 1-bromo-2-(dimethoxymethyl)benzene

In a 100 mL flask o-bromobenzaldehyde (0.7 g, 3.78 mmol) was dissolved in methanol (10 mL) and p-toluenesulfonic acid (0.072 g, 0.378 mmol) was added followed by addition of trimethylorthoformate (1 g, 9.45 mmol). The reaction mixture was refluxed for 7 h at 70° C. before cooling it to 25° C. The reaction mixture was quenched by adding saturated aq. NaHCO$_3$ solution and most of the methanol was evaporated. The solution was extracted with ethyl acetate (25 mL×3). The combined organic layer was dried over anhydrous Na$_2$SO$_4$, concentrated on rota evaporator to get the o-bromoacetal product.

$^1$H NMR (200 MHz, CDCl$_3$): 7.63-7.53 (m, 2H), 7.37-7.14 (m, 2H), 5.56 (s, 1H), 3.38 (s, 6H).

ii. Synthesis of 2-(1-hydroxy-2,3,4,5-tetramethylcyclopent-3-en-1-yl)benzaldehyde Oven dried Schlenck flask was charged with o-bromobenzaldehydedimethylacetal (0.300 g, 1.30 mmol) under argon atmosphere in diethyl ether (10 mL) and the content was cooled to −78° C. A solution of n-BuLi (1.36 mmol) in hexane was added dropwise to the above reaction mixture and the resultant solution was stirred for 1 h at the same temperature. After that a solution of 2,3,4,5-tetramethyl cyclopentenone (0.189 g, 1.36 mmol) was added dropwise to the resultant reaction mixture. The reaction mixture was allowed to warm to 25° C. and stirred for a further 3 h. The reaction was quenched by the addition of 1:1 (toluene:water) mixture and the aqueous layer was removed. The obtained organic layer was washed with saturated brine and then dried over Na$_2$SO$_4$. The solvent was evaporated under vacuum to give a corresponding crude compound which was used for next step without purification.

iii. Synthesis of 2-(2,3,4,5-tetramethylcyclopenta-1,3-dien-1-yl)benzaldehyde The obtained crude product from the coupling reaction was dissolved in a mixture of tetrahydrofuran (10 mL), 3% aq. HCL (5 mL) and acetone (2.5 mL). Further, the reaction mixture was allowed to stir for 18 h at 25° C. before quenching by adding toluene to the reaction mixture. The organic layer was washed with water and saturated brine and then dried over $Na_2SO_4$.

$^1$H NMR (200 MHz, $CDCl_3$): 9.87 (s, 1H), 7.97-7.93 (m, 1H), 7.57 (m, 1H), 7.36-7.20 (m, 2H), 3.22 (s, 1H), 1.93 (s, 3H), 1.86 (s, 3H), 1.72 (s, 3H), 0.96 (d, 3H).

iv. Synthesis of Imine Ligand L10

The 100 mL Schlenck RB was charged with substituted benzaldehyde (0.500 g, 2.21 mmol) in dry methanol (10 mL). To that 2,6-dimethyl aniline (0.294 g, 2.43 mmol) was added followed by addition of molecular sieves and catalytic amount of formic acid (4.1 μL) in the above reaction mixture. Further, the reaction mixture was allowed to stir for next 8 h at 28° C. After completion of the reaction time, molecular sieves were filtered off and washed with dry methanol. Solvent was evaporated to get the corresponding product.

$^1$H NMR (200 MHz, $CDCl_3$): δ 8.39 (s, 1H), 8.13 (s, 1H), 7.52-7.40 (m, 2H), 7.18 (d, 1H), 7.06-7.03 (d, 2H), 3.16 (s, 1H) 2.09 (s, 6H), 1.87 (s, 3H), 1.79 (s, 3H), 1.69 (s, 3H), 0.88 (m, 3H).

Example 2: Synthesis of Metal Complexes

A. Synthesis of Titanium Complex

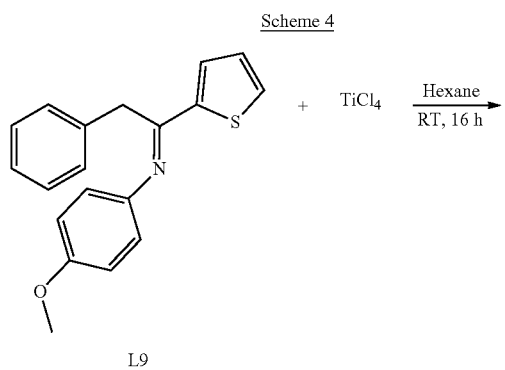

Ligand L9 (0.100 g, 0.34 mmol) was dissolved in n-hexane (20 mL), and $TiCl_4$ (0.34 mL, 0.34 mmol) was added drop wise. The immediately formed green suspension was stirred at 25° C. for 16 h, filtered, and the greenish solid was washed with n-hexane (3×4 mL), dried under vacuum and stored in glove box.

ESI-MS:m/z=495.95 [M–H]$^+$.

B. Synthesis of Chromium Complex (9B)

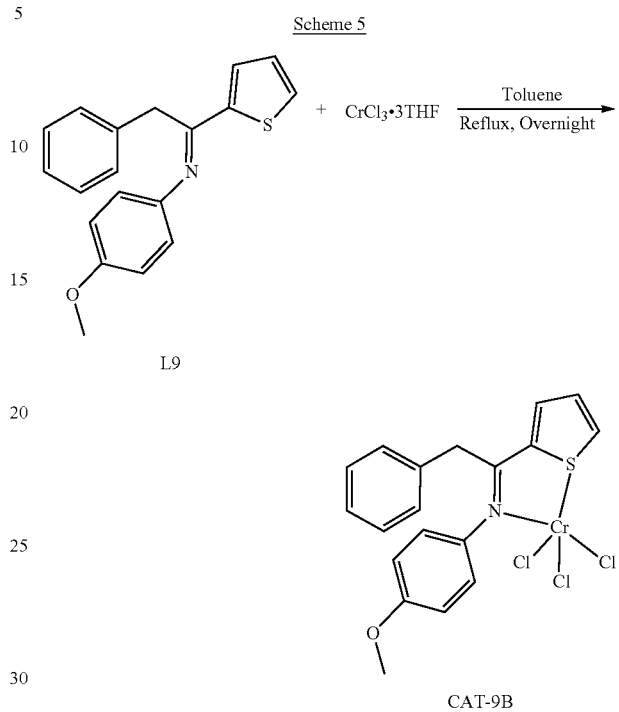

$CrCl_3(THF)_3$ (0.124 g, 0.34 mmol) was taken in a Schlenk flask, to this toluene was added and stirred for 5-10 minutes. Ligand L9 was added directly to the above solution and the temperature of the reaction was raised to 60° C. The reaction mixture was heated 16 h at this temperature. The resultant precipitate was washed two times with toluene (2×5 mL) and 3 times with hexane (3×5 mL). Further, the compound was dried under vacuum and was stored in glove box.

ESI-MS: m/z=465.06 [M+H]$^+$.

C. Synthesis of Zirconium Complex (10C)

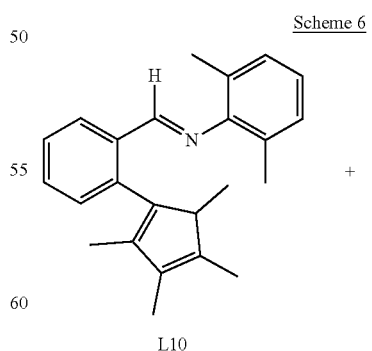

-continued

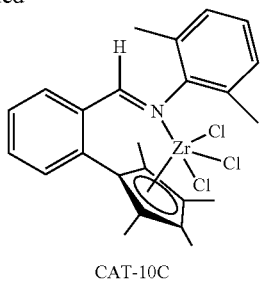

CAT-10C

In an oven dried Schlenk flask, ligand L10 (0.100 g, 0.303 mmol) was dissolved in 5 mL THF and the solution was cooled to −84° C. At this temperature, n-BuLi (0.158 mL, 0.303 mmol) was added dropwise. The reaction mixture was 30° C. and the content was stirred for 1 h. In another Schlenk flask, ZrCl$_4$(THF)$_2$ (0.114 g, 0.303 mmol) was dissolved in (10 mL) THF and the solution was cooled to −84° C. The lithiated ligand solution was transferred using cannula to the solution containing metal precursor at −84° C. The reaction mixture was warmed to 25° C. and stirred for 12 h. Then, THF solvent was evaporated to get blood red colored solid which was washed several times with hexane and further the desired compound was extracted in DCM and solvent was evaporated to get final compound 10C.

ESI-MS: m/z=539.06 [M+H]$^+$.

Example 3:Ethylene Polymerization

A pre-dried 250 mL Büchi reactor was kept under vacuum at 90° C. for 1 hour before use. After cooling down, the reactor was filled with argon and after 3 cycles of vacuum/argon, the reactor was filled with ethylene gas. It was charged with 100 mL of freshly distilled toluene at 27° C. under the positive flow of ethylene gas. The reaction temperature was set to the desired value using Julabo and after the thermal equilibrium is reached, MMAO-12 was added and the mixture was stirred for about 30 minutes. Simultaneously, in a separate Schlenk tube, suitable amount of catalyst was taken and 4-5 ml of dry dichloromethane was added to it. After stirring for 5 minute catalyst was injected in to the reactor to initiate the polymerization. The polymerization was carried out for the 2 h under vigorous stirring and at constant feed of ethylene and then terminated by addition of acidified methanol. The polymer was filtered out, washed with copious amount of methanol/acetone and dried for about 5 h under vacuum at 60° C. to obtain dry polyethylene.

Advantages of the Invention

Linear polyethylene obtained

High to ultra-molecular weight polyethylene is obtained

The polymerization is carried out in favorable conditions

Catalyst of formula (I) show better turn over frequency (TOF).

We claim:

1. A homogeneous, single site catalyst of formula (I)

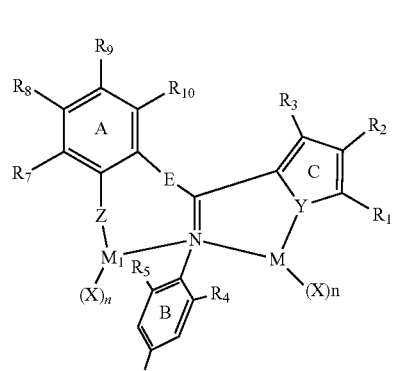

Formula I

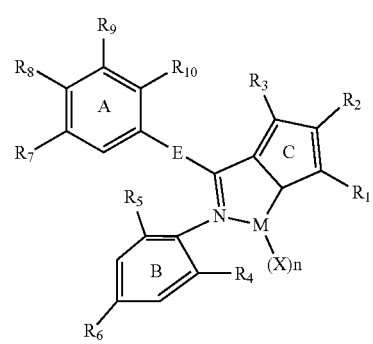

Formula I wherein $R_1$-$R_3$ are selected from the group consisting of H, Alkyl and Aryl;

$R_4$-$R_6$ are selected from the group consisting of H, Alkyl, Aryl, OMe and OEt;

$R_7$-$R_{10}$ are selected from the group consisting of H, Alkyl and Aryl;

M is selected from the group consisting of Cr, Ti, Zr and Hf;

X is selected from the group consisting of Cl, Br and I;

n is selected from the group consisting of 2, 3 and 4;

Y is selected from the group consisting of S, O, —NH and —CH$_2$; and

E is CH2.

2. The catalyst as claimed in claim 1, wherein representative structures of said catalyst of formula I are:

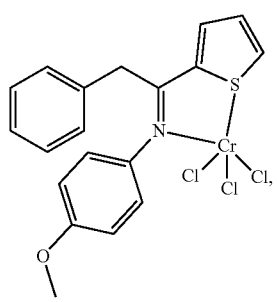

CAT-9B

CAT-9A

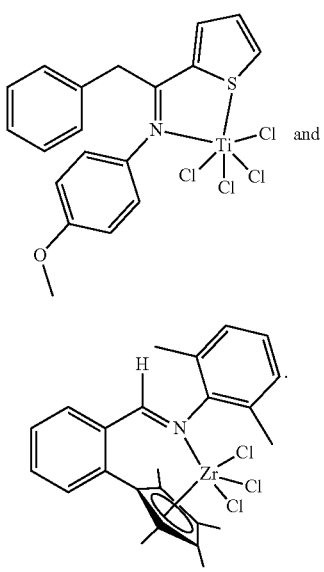

CAT-10C

3. A process for a preparation of the catalyst of formula (I) as claimed in claim 1, wherein said process comprising a step of reacting a ligand with a metal halide or an alkyl lithium at a temperature in the range of −80° C. to 30° C. for a time period in the range of 1 to 20 hours in a solvent to obtain the catalyst of formula (I), wherein said ligand is selected from L1 to L10 having ligand L1 is (Z)-2-(cyclopenta-1,3-dien-1-yl)-N-(4-methoxyphenyl)-1-phenylethan-1-imine; the ligand L2 is (Z)-2-(cyclopenta-1,3-dien-1-yl)-N-(4-methoxyphenyl)-1-(o-tolyl)ethan-imine; the ligand L3 is (Z)-2-(cyclopenta-1,3-dien-1-yl)-1-(2,6-dimethylphenyl)-N-(4-methoxyphenyl)ethan-1-imine; the ligand L4 is (Z)-2-(cyclopenta-1,3-dien-1-yl)-1-(2,6-di-tert-butylphenyl)-N-(4-methoxyphenyl)ethan-1-imine the ligand L5 is (Z)—N-(4-methoxyphenyl)-1-phenyl-2-(2,3,4-trimethylcyclopenta-1,3-dien-1-yl)ethan-1-imine: the ligand L6 is (Z)—N-(4-methoxyphenyl)-1-(o-tolyl)-2-(2,3,4-trimethylcyclopenta-1,3-dien-1-yl)ethan-1-imine: the ligand L7 is (Z)-1-(2,6-dimethylphenyl)-N-(4-methoxyphenyl)-2-(2,3,4-trimethylcyclopenta-1,3-dien-1-yl)ethan-1-imine: the ligand L8 is (Z)-1-(2,6-di-tert-butylphenyl)-N-(4-methoxyphenyl)-2-(2,3,4-trimethylcyclopenta-1,3-dien-1-yl)ethan-1-imine: the ligand L9 is (E)-N-(4-methoxyphenyl)-2-phenyl-1-(thiophen-2-yl) ethan-1-imine and the ligand L10 is (E)-N-(2,6-dimethylphenyl)-1-(2-(2,3,4-trimethylcyclopenta-1,3-dien-1-yl)phenyl)methanimine.

4. The process as claimed in claim 3, wherein said metal halide is selected from $TiCl_4$, $CrCl_3 \cdot 3THF$, $ZrCl_4 \cdot 2THF$ and $HfCl_4$, said alkyl lithium is selected from butyl lithium (BuLi), and said solvent is selected from toluene, tetrahydrofuran and hexane.

5. The process as claimed in claim 3, wherein said ligand L1 to L8 is prepared by a process comprising the steps of:
a) adding a solution of bromoacetyl bromide in dichloromethane to a solution mixture of N, O-dimethyl hydroxylamine hydrochloride and triethyl amine solution at 0° C. and allowing the resultant solution to warm to 28° C. and continuing stirring for one hour to obtain 2-bromo-N-methoxy-N-methylacetamide;
b) adding (un)substituted sodium cyclopentadienylide solution in THF dropwise to the stirring solution of step (a) at a temperature −78° C., stirring for 3 hours and adding dichloromethane to precipitate NaBr, and separating to obtain 2-(cyclopenta-1,3-dien-1-yl)-N-methoxy-N-methylacetamide;
c) adding solution of (un)substituted phenyl magnesium bromide in THF drop wise to a stirring solution of step (b) at 0° C. and continuing stirring to obtain 2-(cyclopenta-1,3-dien-1-yl)-1-phenylethan-1-one; and
d) mixing acetophenone derivatives of step (c) and p-anisidine and stirring in methanol at 70° C. for 15 to 17 hours in the presence of molecular sieves, filtering and removing the solvent to obtain the corresponding ligand.

6. A process for preparation of polyethylene using the catalyst of formula (I) as claimed in claim 1 comprising the steps of:
a) charging a toluene into an ethylene filled reactor in an inert atmosphere followed by adding methylaluminoxane (7 wt % aluminum in toluene), and
b) dissolving the catalyst of formula (I) as claimed in claim 1 in a solvent and adding to the reactor of step (a) and keeping the reactants stirred for 0.5 to 3 hours at a temperature range of 30-70° C. with ethylene being pumped continuously to obtain the polyethylene.

7. The process as claimed in claim 6, wherein said solvent of step (b) is selected from dichloromethane or toluene.

8. The process as claimed in claim 7, wherein said polyethylene is linear and has a molecular weight in the range of 50000 Da to 3 million Dalton.

9. The process as claimed in claim 7, wherein said polyethylene has melting temperature in the range of 139-144° C., the degree of crystallinity in the range of 60-90%, the polydespersity index in the range of 1.5 to 10, and the turn over frequency in the range of >100-50000.

* * * * *